United States Patent [19]

Kawamura et al.

[11] 4,402,589
[45] Sep. 6, 1983

[54] CORRECT EXPOSURE ANNUNCIATING DEVICE

[75] Inventors: Masaharu Kawamura, Kawasaki; Hiroyuki Kataoka, Omiya; Makoto Katsuma, Kawasaki; Masanori Uchidoi, Yokohama, all of Japan

[73] Assignee: Canon Kabushiki Kaisha, Japan

[21] Appl. No.: 356,098

[22] Filed: Mar. 8, 1982

[30] Foreign Application Priority Data

Mar. 10, 1981 [JP] Japan .................................. 56-34372
Mar. 12, 1981 [JP] Japan .................................. 56-36264

[51] Int. Cl.³ ............................................ G03B 15/05
[52] U.S. Cl. ........................................................ 354/128
[58] Field of Search ............... 354/33, 60 F, 127, 128, 354/139, 145, 149, 289; 315/133, 134, 136, 151, 241 P

[56] References Cited

U.S. PATENT DOCUMENTS

| | | | |
|---|---|---|---|
| 3,979,639 | 9/1976 | Adams, Jr. ...................... | 354/128 X |
| 3,993,928 | 11/1976 | Wilwerding ..................... | 354/128 X |
| 3,999,193 | 12/1976 | Hasegawa ........................ | 354/128 X |
| 4,200,370 | 4/1980 | Aizawa et al. ................... | 354/139 X |
| 4,331,406 | 5/1982 | Kiuchi et al. ........................ | 354/128 |

*Primary Examiner*—William B. Perkey
*Attorney, Agent, or Firm*—Toren, McGeady and Stanger

[57] ABSTRACT

A correct exposure annunciator has an element to indicate a correct exposure. The indicating element is energized in normal flash photography to indicate correct exposure. When abnormal flash photography is carried out, the element is de-energized by a signal, representing the AE mode, and the light is turned off.

3 Claims, 6 Drawing Figures

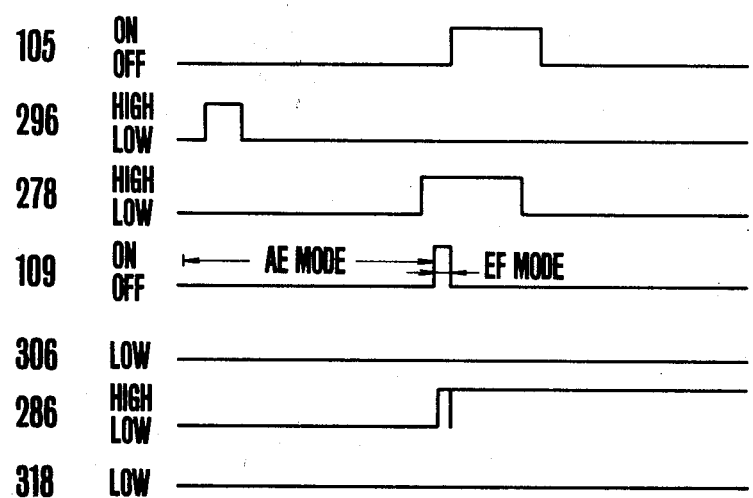
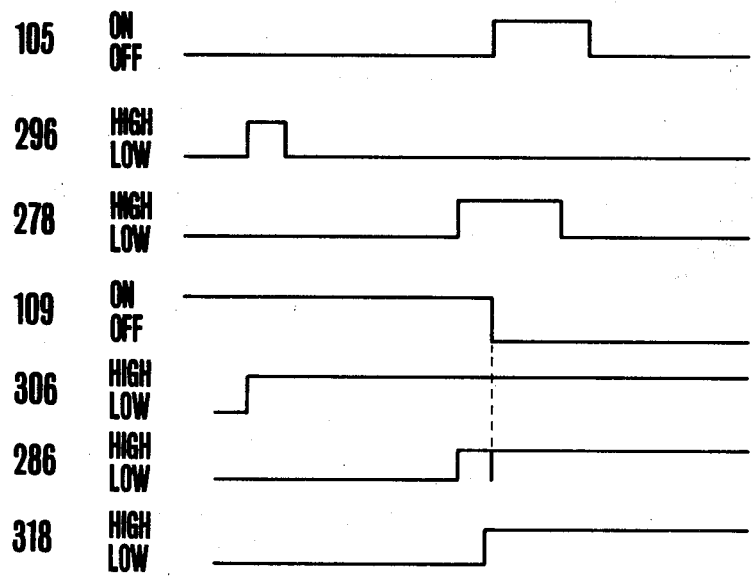

CORRECT EXPOSURE ANNUNCIATING DEVICE

BACKGROUND OF THE INVENTION

1. Field of the Invention

The present invention relates to an indicating device, particularly to a correct exposure annunciation device for a computer flash unit.

2. Description of the Prior Art

Heretofore, a correct exposure annunciating device, which is made to indicate completion of the light adjusting action of a computer flash unit, has been known. The conventional correct exposure annunciating device, however, detects a signal generated at a flash unit, for example, a signal to stop a light emission and makes an indication in response to said signal. It has a shortcoming in that even if an improper photograph is made, as an example, a slit shape exposure is made, such an erroneous indication is made that a normal flash photograph is made.

SUMMARY OF THE INVENTION

The present invention is to provide a correct exposure annunciating device in which the above-mentioned shortcoming is eliminated.

Other objects of the present invention shall be made clear through the following detailed explanations.

BRIEF DESCRIPTION OF THE DRAWINGS

FIGS. 4 and 5 are waveform diagrams for the circuit shown in FIG. 2; and

DESCRIPTION OF THE PREFERRED EMBODIMENTS

Figure 1:
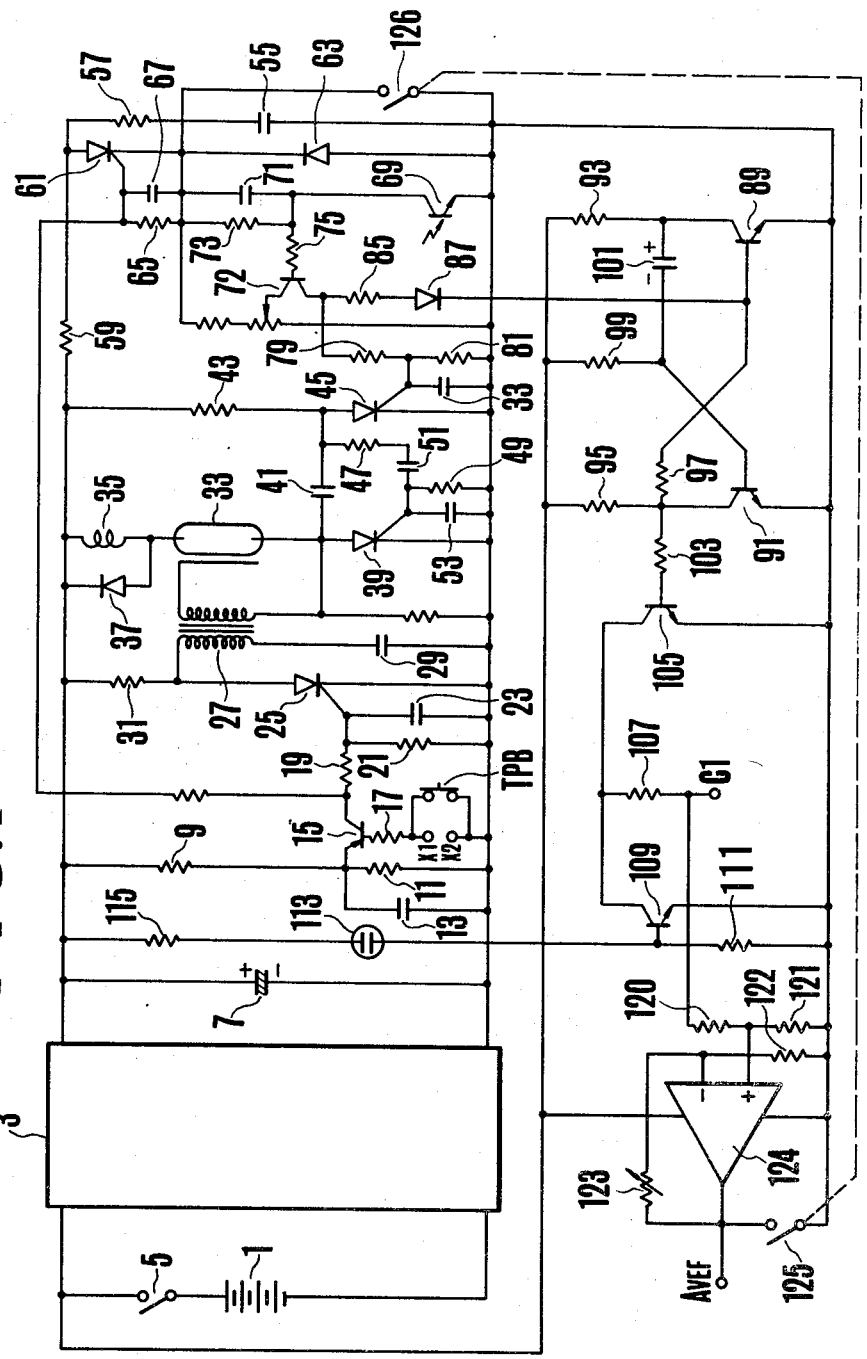
FIG. 1 is an electrical circuit diagram of a flash unit for a camera system to which the present invention is applied.

FIG. 1 is a circuit diagram for a camera system to which the present invention is applied, wherein 1 is a power source battery, 3 is a known type of DC—DC converter connected to said battery through a power switch 5 of normally opened type, and 7 is a main capacitor, while 9, 11 are resistors forming a bleeder circuit which is connected in parallel with said main capacitor. Also, resistor 11, forming said bleeder circuit has a capacitor 13 connected in parallel with it. A PnP transistor 15 is connected to said resistor 11, and its base is grounded through an X-terminal provided at the camera side. TPB is a test button, 19 and 21 are resistors, and 23 is a capacitor to prevent a thyristor 25 from making an erroneous action by a noise, while 27 is a trigger transformer connected to said thyristor 25 and the trigger capacitor 29. A resistor 31 form a charging path for the trigger capacitor 29, and 33 is a discharge tube connected to the above-mentioned main capacitor 7 through a coil 35, while 37 is a diode, and 39 is a main thyristor connected in series to the discharge tube 33. What is shown as 41 is a commutation capacitor connected to an output terminal of the DC—DC converter 3 through a charging resistor 43, and 45 is an auxiliary thyristor, while 47 and 49 are resistors. 51 and 53 are capacitors, and 55 is a capacitor connected to an output terminal of the DC—DC converter through resistors 57 and 59, while 61 and 63 are a thyristor and a zener diode forming a series circuit connected in parallel with a series circuit formed by the resistor 57 and the capacitor 55. 65 and 67 are a resistor and a capacitor connected in parallel between a gate and a cathode of the thyristor 61, and 69 is a photo-transistor to receive light reflected from an object (not shown in the drawing), while an integration capacitor 71 is connected in series to said photo-transistor 69. A correction resistor 73 is connected in parallel with the capacitor 71, and 75 is a resistor connected to a base of a switching transistor 77, while 79 and 81 are resistors to transmit a light emittance stop signal to a light emittance stop circuit, and 83 is a capacitor. 85 and 87 are a resistor and a diode to guide the stop signal from the transistor 77 to a monostable multivibrator circuit (hereinafter; one shot) to be described later, and a cathode of said diode 87 is connected to the base of an npn transistor 89 forming an input terminal of the one shot. 89 and 91 are npn transistors forming a known type of one shot, and 93, 95, 97 and 99 are resistors which also form a known type of one shot. 101 is a time constant capacitor to determine an output time interval of the one shot together with the resistor 99. 105 is an npn transistor connected to an output terminal of the one shot through a resistor 103, a collector of said transistor 105 is connected to a charging completion signal output terminal C1 through a resistor 107. 109 is an npn transistor, having a resistor 111 and a neon tube 113 connected to its base, and said neon tube 113 is connected to an output terminal of the main capacitor 7 through a resistor 115. 120 and 121 are high resistors to divide the voltage at the output terminal C1, and 124 is an operation amplifier (hereinafter: OP-AMP) forming a non-inversion amplifier, while 122 is a resistor connected to a non-inversion terminal of the OP-AMP 124. What is shown as 123 is a variable resistor to set a film speed and an aperture value, and $A_{VEF}$ is an aperture signal output terminal connected to an output terminal of the OP-AMP 124, while 125 is a switch connected to a power source terminal and an output terminal of the OP-AMP 124 to make an output voltage of the output terminal $A_{VEF}$ 0 (V) when the flash unit is placed in a manual emitting state.

Figure 2:
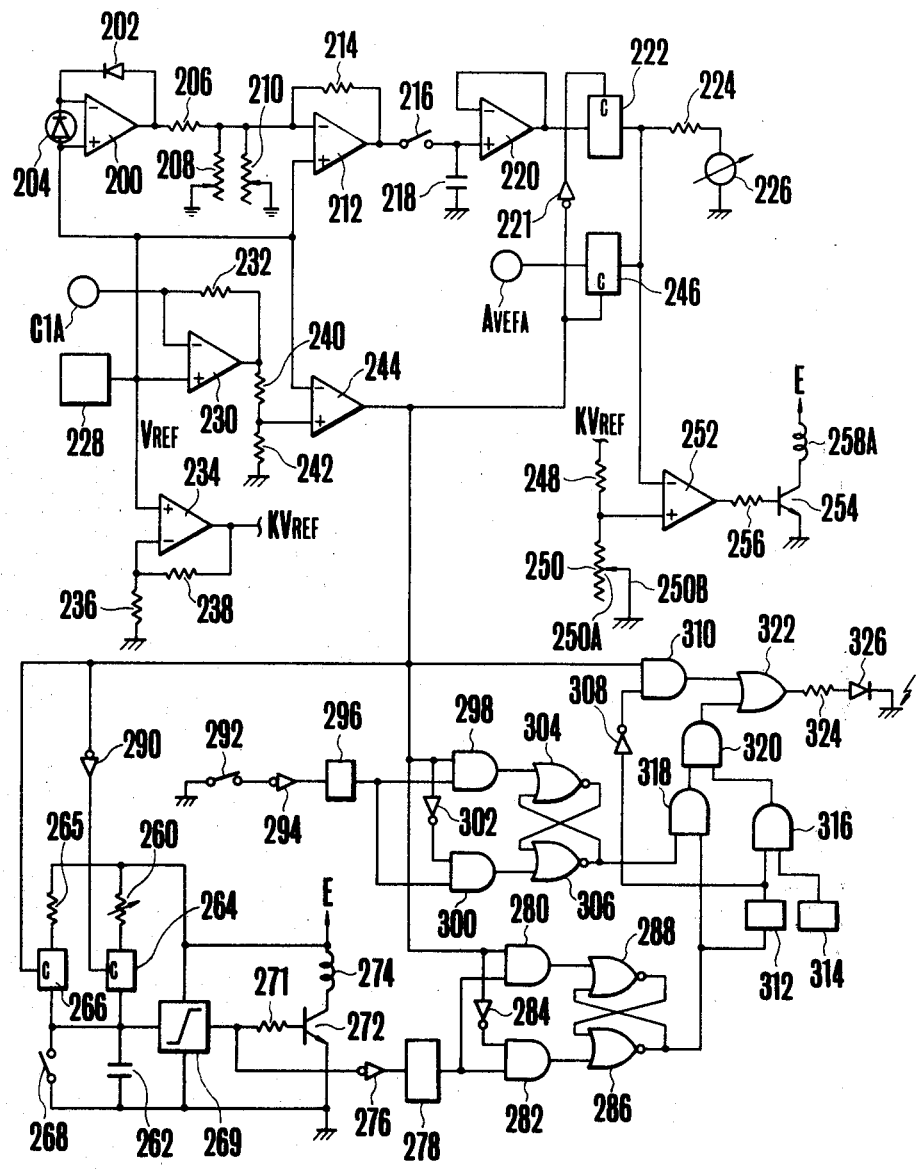
FIG. 2 is an electrical circuit diagram of a camera in the above-mentioned camera system.

FIG. 2 is an electrical circuit diagram of the above-mentioned camera system, wherein 200 is an OP-AMP, 202 is a diode, to logarithmically compress photo-current, connected to a feedback path of the OP-AMP 200, and 204 is a photo-cell connected between the input terminals of the OP-AMP 200. 206 is a resistor, and 208 is a variable resistor connected to a film speed setting dial (not shown in the drawing), while 210 is a variable resistor connected to a shutter speed setting dial. What is shown as 212 is an OP-AMP forming an operation and 214 is a resistor, while 216 is a memory switch which is closed during a photo-metering and is opened just before a mirror up. 218 is a memory capacitor, and 220 is an OP-AMP forming a buffer amplifier, while 222 is an analog switch which is supplied with power during the natural light photography mode (hereinafter: AE mode), and 226 is an aperture value indication meter connected to an output terminal of the analog switch 222. What is shown as C1A is a terminal contacting the output terminal C1 of the flash unit shown in FIG. 1 when the flash unit is mounted on the camera, and 228 is a reference voltage generation circuit generating a reference voltage $V_{REF}$, while 230 is an OP-AMP. 232 is a resistor connected to a feed back path of the OP-AMP 230, and 234 is an OP-AMP to generate a voltage $KV_{REF}$, while 236, 238, 240 and 242 are resistors. What is shown as 244 is a comparator, and $A_{VEFA}$ is a terminal contacting the terminal $A_{VEF}$ shown in FIG. 1 when the flash unit is mounted on the camera, while 246 is an analog switch which has power supplied thereto during the flash photography mode (hereinafter: EF mode). 248 is a resistor connected to an output terminal of the above-mentioned OP-AMP 234, and 250 is an aperture signal generating resistor formed by a resistor body 250A and a brush 250B, to be described below, while 252 is a comparator. 254 is an npn transistor connected to an output terminal of the aperture size determining comparator 252 through a resistor 256, and 258A is a coil of an aperture size determining magnet, connected to the collector of the transistor 254, while 260 is a variable resistor associated with the above-mentioned shutter speed setting dial (not shown in the drawing). 262 is a time constant capacitor, and 264 is an analog switch connected between resistor 260 and capacitor 262, while 265 is a resistor to regulate the shutter speed so that it is suitable for flash photography. 266 is an analog switch connected between resistor 265 and capacitor 262, and 268 is a start switch which is normally connected in parallel with capacitor 262 and is opened when a leading shutter screen (not shown in the drawing) starts running. 269 is a Schmidt trigger circuit connected to an output terminal of the capacitor 262. 272 is an npn transistor connected to an output terminal of the Schmidt trigger circuit 269 through a resistor 271, and 274 is a coil of a follower shutter screen (not shown in the drawing) control magnet connected to a collector of transistor 272, while 276 is an inverter. What is shown as 278 is a monostable multivibrator, and 280 and 282 are AND gates, while 284 is an inverter. 286 and 288 are NOR gates forming a flip-flop, and 290 is an inverter, while 292 is a switch closed in association with the pressing down of a shutter release button (not shown in the drawing). 294 to 306 represent circuitry forming an AE mode distinguishing circuit (a circuit to judge whether the photography mode is for natural light or not), and 294 is an inverter, while 296 is a one shot. 298 and 300 are AND gates, and 302 is an inverter, while 304 and 306 are NOR gates forming a flip-flop. 308 is an inverter, and 310 is an AND gate, while 312 is a one shot. 314 is an oscillator, and 316, 318 and 320 are AND gates, while 322 is an OR gate. 326 is a light emitting diode to display a correct exposure annunciating signal, and the anode of said light emitting diode 326 is connected to OR gate 322 through resistor 324, while a cathode thereof is grounded. Further, said light emitting diode is provided at a position allowing a visual recognition within a viewfinder (not shown in the drawing) of a camera.

Figure 3:
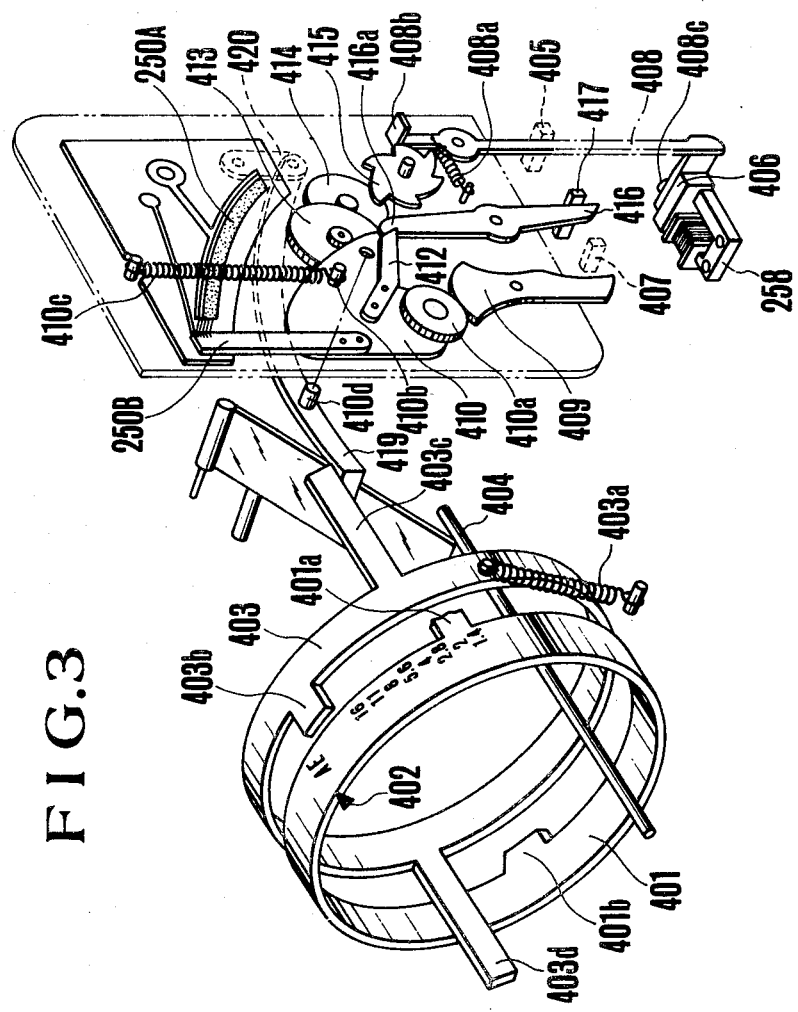
FIG. 3 shows an arrangement of important parts of the above-mentioned camera in said camera system.

FIG. 3 shows an arrangement of important parts of the camera in the above-mentioned camera system, and this drawing shows a state in which a film wind up and a shutter charging are completed.

In FIG. 3, 401 is an aperture ring and a mark AE for an automatic aperture setting and marks (1.4 to 16) for a manual aperture setting are engraved on said aperture ring 401, and at the same time a projection part 401a and a cam part 401b are provided. What is shown as 402 is a mark, and 403 is an aperture preset ring which is rotatingly biased to the clockwise direction by a strong spring 403a and has a projection 403b which can engage with the projection 401a of the aperture ring 401. Arm 403c is also provided at the aperture preset ring 403, further, the aperture preset ring 403 has a lever 403d planted thereon. Said lever 403d is to determine a rotation of a bell crank (not shown in the drawing) through an aperture setting ring (not shown in the drawing), and said bell crank is to restrict the rotation of an aperture driving ring, not shown in the drawing, for determining the amount of opening of the aperture. 404 is a pin planted on the above-mentioned aperture driving ring (not shown in the drawing) and the end of this pin 404 engages with an automatic aperture lever, rotatingly biased to the counterclockwise direction, of an automatic diaphragm aperture unit (not shown in the drawing). 405 is a trident lever which constitutes a charging member to have an armature 406 attracted to the aperture size determining magnet 258, and one end of said lever 405 engages with a stepped part (not shown in the drawing) of the charge lever 407, while another end thereof is checked by a hooked part of a release lever 417. The remaining end thereof engages with a stop wheel claw 408. The automatic exposure control unit has a charge gear 409 which engages with the charge lever 407. 410 is a sector gear which has a gear 410a meshing with a charge gear 409 and has the slider piece 250b and an AE checking plate 412 fixed thereto. Further, speed regulating gears 413, 414 and a stop wheel 415 engage with the sector gear 410. Also, a spring 410c is placed around pin 410b planted on the sector gear 410, and said spring 410c rotatingly biases the sector gear 410 in the counterclockwise direction. Spring 410c is set somewhat weaker than the above-mentioned spring 403a at the lens side. What is shown as 416 is an AE checking lever to check a checking plate 412 of the sector gear 410. 408 is a stop wheel claw being rotatingly biased to the counterclockwise direction by a spring 408a, and one end of said claw is formed as a claw part 408b to stop a rotation of a stop wheel 415, while the other end thereof is axially supported at the above-mentioned armature 406 by an axle 408c. 250A is the resistor body shown in FIG. 2 and the output resistance is varied as the brush 250B slides over the resistor 250A. 419 is an aperture signal lever, one end engages with an arm 403c of the above-mentioned preset ring 403 and the other end is axially supported by a supporting lever 420. What is shown as 410d is a pin planted on the aperture signal lever 419 and the sector gear 410.

The function of the camera system having the above-mentioned arrangement shall be explained, referring to FIGS. 1, 4 and 5. First, explanation will be made on a case when a film is exposed in a slit shape, that is, a case when the light emitting preparation of a flash unit has not been completed and the shutter speed for generating a slit exposure is set on the camera.

When the flash unit, shown in FIG. 1, is mounted on the camera shown in FIGS. 2 and 3, and the power switch 5 is closed, the main capacitor 7, the commutation capacitor 41, etc., are charged by a known method.

Then, as a release button (not shown in the drawing) is pressed down and power is supplied to each circuit of the camera, shown in FIG. 2, the reference voltage is impressed on the plus input terminal (+) of the operational amplifier 124, shown in FIG. 1, from the camera side through the terminal C1A, shown in FIG. 2, and the terminal C1, shown in FIG. 1, and such aperture size signal as corresponds to the determined aperture size is produced from the output terminal $A_{VEF}$. While the aperture size signal is supplied to the input terminal of the analog switch 246, for example, a field effect transistor (hereinafter: FET), through the terminal $A_{VEFA}$ at the camera side, said input signal will not be supplied to the aperture value indicating meter 226 at this time. That is, at this time, since the main capacitor 7 is not yet sufficiently charged and the neon tube 113 is not lit, the output of the comparator 244 is at a low level (hereinafter: L). As a result thereof, the analog switch 246 is in a closed state, thus the input signal of the analog switch 246 is not supplied to the meter 226.

On the other hand, since a signal from the comparator 244, which is supplied to the control electrode of the analog switch 222 through the inverter 221, is at a high level (hereinafter: H) under this state, an aperture size signal as corresponds to the object brightness information, measured by the photocell 204, a shutter speed information, set at the resistor 210, and a film speed information, set at the resistor 208, will be supplied to the meter 226. Therefore, the meter 226 indicates an aperture size signal for natural light photography (hereinafter: AE mode).

In this state, preparation of the flash unit is not completed, that is, when the output of the comparator 244 is L, the analog switch 266, shown in FIG. 2, retains its closed state, while the analog switch 264 retains its opened state, and the shutter speed setting resistor 260 is connected to the time constant capacitor 262. A shutter speed for the AE mode is also selected.

The shutter speed selected in this case is supposed to be 1/500 second which will generate a slit exposure.

Further, when the above-mentioned flash preparation is not completed, the analog switch 222 retains its opened state and an aperture size signal for the AE mode passing through the buffer circuit 220 is supplied to a minus input terminal of the aperture value control comparator 252.

When a known type of a release button (not shown in the drawing) is further depressed under said state and the switch 292 is closed by said release button, current flows to the coil 258A of the aperture size determining magnet 258, and the magnet 258 is energized to have the armature 406 attracted to the magnet 258.

On the other hand, the one shot 296 produces an output signal H for a prescribed period of time as shown in the waveform diagram 296 of FIG. 4 by a closing of the switch 292, which is also synchronized with the output of said one shot 296, the flip-flop 304, 306 latches a signal from the comparator 244 to indicate that flash preparation has not been completed, and the output of the NOR gate 306 becomes L.

When the release button is pressed down as mentioned above, a release magnet (not shown in the drawing) is placed in a de-energized state, and the mechanism of the camera is released to open the memory switch 216, then a known type of a swing mirror (not shown in the drawing) starts ascending. When said mirror starts ascending, the release lever 417 rotates in the clockwise direction by a known method causing the AE checking lever 416 to rotate in the clockwise direction to release the AE checking lever 416 and the AE checking plate 412. Therefore, the spring 403a rotates the sector gear 410 in the clockwise direction through the aperture preset ring 403, the arm 403c, the aperture size signal lever 419 and the pin 410d. As the sector gear 410 starts rotating as mentioned above, the brush 250B slides over the resistor body 250A and, at the same time, the aperture is stopped down. Therefore, the resistance value of the resistor 250 gradually changes to correspond to the required aperture size. When the potential at the plus input terminal of the comparator 252, corresponding to the resistance value of the resistor 250, reaches the potential of the minus input terminal of the comparator 252, corresponding to an appropriate aperture value, the output of the comparator 252 becomes L and the magnet driving transistor 254 turns OFF, therefore, the aperture size determining magnet 258 is de-energized, and the stop wheel claw 408 is rotated in the counter-clockwise direction by the spring 408a. Then, the claw part 408b meshes with a tooth of the stop wheel 415, thus an optimum aperture size is determined.

On the other hand, when the above-mentioned control of the aperture size is completed and a known type of leading shutter screen (not shown in the drawing) starts running, the start switch 268 is opened and a shutter opening time determining action is started.

As the 1/500 second, determined by the resistor 260 and the capacitor 262 has elapsed, from a moment said action is started, the magnet 274 for controlling a known type of follower shutter screen (not shown in the drawing) is de-energized and the follower shutter screen runs over a plane of a film (not shown in the drawing) while forming a slit following the leading shutter screen.

At the same time that the above-mentioned follower shutter screen control magnet 274 is de-energized, a trigger signal passes through the inverter 276 and is impressed on the input of the one shot 278 from the Schmidt circuit 269, therefore, the one shot 278 produces a signal H, shown in the waveform diagram 278 of FIG. 4, for a prescribed period of time.

When the charging of the main capacitor 7 is completed and the transistor 109 is turned ON with such timing as shown in the waveform diagram 109 of FIG. 4, the output of the collector 244 is inverted from L to H and the potential at the two input terminals of the AND gate 280 also becomes H. Therefore, the output of the AND gate 280 is inverted from L to H, also the output terminal of the NOR gate 286 forming an output terminal of the flip-flop is inverted from L to H.

Further, when the output of the comparator 244 is inverted from L to H as mentioned above, the analog switches 222 and 264, shown in FIG. 2 are closed and the analog switches 246 and 266 are opened, then the aperture control circuit and the shutter speed control circuit, shown in FIG. 2, are changed over to the EF mode, but since control of the aperture has been completed and the time constant action of the shutter speed control circuit has been completed, said change of the mode will not affect the above-mentioned aperture control circuit and the shutter speed control circuit. Further, as a time elapses and the leading shutter screen reaches the end of its running, a synchronous contact (not shown in the drawing) is closed, the transistor 15, shown in FIG. 1, is turned ON in synchronization with the closing of the contact, and thyristor 25 is turned ON, then the discharge tube 33 emits light and the object is illuminated. On the other hand, at the same time the thyristor 25 is turned ON, the thyristor 61 is also turned ON, therefore, the electric charge accumulated beforehand at the capacitor 55 is discharged through the resistor 57, the thyristor 61, and the zener diode 63 and a driving voltage with a prescribed level, restricted by the zener diode 63, is supplied to the circuit to generate a light emittance stop signal. Therefore, said circuit starts functioning when the light emittance is made. When the amount of light reflected from the object reaches a prescribed value, the base potential of the transistor 77 comes down to a prescribed value, therefore the transistor 77 is turned ON and a light emittance stop signal is produced from the collector of the transistor 77. Since the thyristor 45 is turned ON by said generation of the stop signal, the thyristor 39 is turned OFF, and the light emittance by the discharge tube 33 is stopped.

Because the leading shutter screen and the follower shutter screen are running while forming a slit, as mentioned before, the film will be exposed in a slit form.

On the other hand, the above-mentioned light emittance stop signal is supplied to the base of the transistor 89 of the one shot, through the resistor 85 and the diode 87, and the transistor 89 is turned ON, therefore, the collector potential of the transistor 91, which constitutes an output terminal of the one shot shown in FIG. 1, becomes H for a prescribed length of time and is synchronized with the generation of the light emittance stop signal. As the collector potential of the transistor 91 becomes H, collector current flows to the collector of the transistor 105 through the terminal CIA shown in FIG. 2, the terminal C1 shown in FIG. 1 and the resistor 107, therefore, the light emittance stop signal is transmitted to the input terminal of the comparator 244 at the camera side through the charging completion signal output terminal C1.

When the light emittance stop signal (that is, a correct exposure annunciating signal) which indicates that a photograph has been made with an appropriate exposure is impressed on the comparator 244 at the camera side, from the flash unit side, as mentioned above, the output of the comparator 244 again becomes H and the output of the NOR gate 286, of the flip-flop which is controlled by the output of said comparator 244, becomes H again.

On the other hand, when the output of the comparator 244 is changed from L to H by the generation of the light emittance stop signal, while the output signal of said comparator 244 is also supplied to the control circuits 298, 300, 302 of the flip-flop 304, 306, as the output of the one shot 296 is L (as shown in the waveform diagram 296 of FIG. 4) at this time, the output of the NOR gate 306, forming the output terminal of the flip-flop, becomes L (as shown in the waveform diagram 306 of FIG. 4).

Therefore, even if the output of the NOR gate 286 of the flip-flop becomes H in response to the generation of the above-mentioned light emittance stop signal, the AND gates 318 and 320 are not opened, because the output of the NOR gate 306 of the AE mode distinguishing circuit retains L, that is, because the AE mode distinguishing circuit produces a signal to indicate the AE mode.

Also at this time when the output of the one shot 312 is H and the output of the inverter 308 is L, the output of the AND gate 310 becomes L. Therefore, even if the light emittance stop signal is produced at the flash unit, said light emittance stop signal is overridden and the output of the OR gate 322 becomes L, thus the light emitting diode 326 will not display a light emittance stop signal.

Therefore, a photographer can visually recognize that an improper photograph, that is, a photograph where the film is exposed in a slit shape, has been made.

Next, explanation will be made of the function of the camera system in a case when the film is totally exposed, that is, a case when an appropriate flash photograph is made.

It is now supposed that the terminal voltage of the main capacitor 7 reaches a level allowing a light emittance when the flash unit is attached to the camera, and the neon tube 113 is lighted.

As mentioned above, when the release button is pressed down to supply power to each circuit of the camera shown in FIG. 2, and the transistor 19 is turned ON by a lighting of the neon tube 113, the output of the comparator 244 is inverted from L to H. Therefore, as explained in the above-mentioned example, the analog switches 246 and 266 are both opened and a voltage corresponding to the aperture value set at the flash unit side is supplied to the minus input terminal of the comparator 252 of the aperture control circuit through the output terminal $A_{VEF}$ at the flash unit side, the terminal $A_{VEFA}$ at the camera side and the analog switch 246. Also, the time constant circuit of the shutter speed control circuit selects resistor 265 which has a fully opened shutter time for flash photography set therein.

When the output of the comparator 244 is inverted to H in response to a charging completion of the main capacitor 7, the output of the AND gate 310 becomes H and the light emitting diode 326 displays a charging completion.

When the release button is further pressed down under such state and the switch 292 is closed, current flows to the coil 258A of the aperture size determining magnet 258 and the magnet 258 is energized, then the armature 406 is attracted to the magnet 258.

On the other hand, the one shot 296 produces an H signal for a prescribed length of time as shown in the waveform diagram 296 of FIG. 5, by the closing of the switch 292, also the flip-flop 304 and 306 latches the charging completion signal from the comparator 244 simultaneously with the output of the one shot 296, and the output of the NOR gate 306 thereof is inverted to H from L as shown in the waveform diagram 306 of FIG. 5.

When the release button is pressed down as mentioned above, the camera is released, the mirror goes up and the aperture size is controlled in the same manner as described above. Since the aperture signal from the flash unit is supplied to the minus input terminal of the comparator 252 at this time, the aperture size will become one suited for flash photography.

On the other hand, when the control of the aperture size is completed and the leading shutter screen starts running, the start switch 268 is opened and the time constant action for determining the shutter opening time is started. And when 1/60 second, determined by the resistor 265 and the capacitor 262, has elapsed, the magnet 274 for controlling the follower shutter screen is de-energized, thus the follower shutter screen starts running.

At the same time said follower shutter screen control magnet 274 is de-energized, the trigger signal is supplied to the input of the one shot 278 from the Schmidt circuit 269 through the inverter 276, therefore, the one shot 278 produces an H signal, shown in the waveform diagram 278 of FIG. 5, for a prescribed length of time.

When the leading shutter screen reaches the end of its run and the shutter is fully opened (of course, at this time the follower shutter screen does not cover an image aperture), the synchronous contact is closed and the discharge tube 33 emits lights, thus the object is illuminated by a flash from said discharge tube 33. Also, since the terminal voltage of the main capacitor 7 drops sharply because of this light emittance, the transistor 109 is inverted from ON to OFF, as shown in the waveform diagram 109 of FIG. 5, and the output of the comparator 244 is inverted from H to L. Therefore, the output of the AND gate 310 changes to L from H and the light emitting diode 326 is turned OFF to indicate that the terminal voltage of the main capacitor is placed in a state corresponding to incomplete charging.

When the amount of light reflected from the object reaches a prescribed amount, and a light emittance stop signal is produced, the transistor 105 is turned ON for a prescribed length of time as shown by the waveform diagram 105 of FIG. 5. Therefore, the output of the comparator 244 again becomes H and the comparator 244 indicates the fact that a light emittance stop signal has been generated at the flash unit side to indicate that a photograph has been made with an appropriate amount of exposure. Since the output of the one shot 278 at this time is H, as shown in FIG. 5, because the output of the comparator 244 is inverted from L to H as mentioned above, the output of the NOR gate 286 of the flip-flop 288 and 286 becomes H, placing the potential at one of the input terminals of the AND gate 318 in the H state.

The other input terminal of the AND gate 318 has become H, because of the output of the NOR gate 306, therefore, the AND gate becomes H simultaneously with the generation of the light emittance stop signal. Therefore, the AND gate 320 receives a pulse signal from the oscillator 314 which passes through to drive the light emitting diode 326 with said pulse signal from the oscillator 314, causing the light emitting diode 326 to flicker. Thus, the light emitting diode 326 indicates that a flash photograph has been made under an appropriate lighting state with the appropriate exposure.

Figure 6:
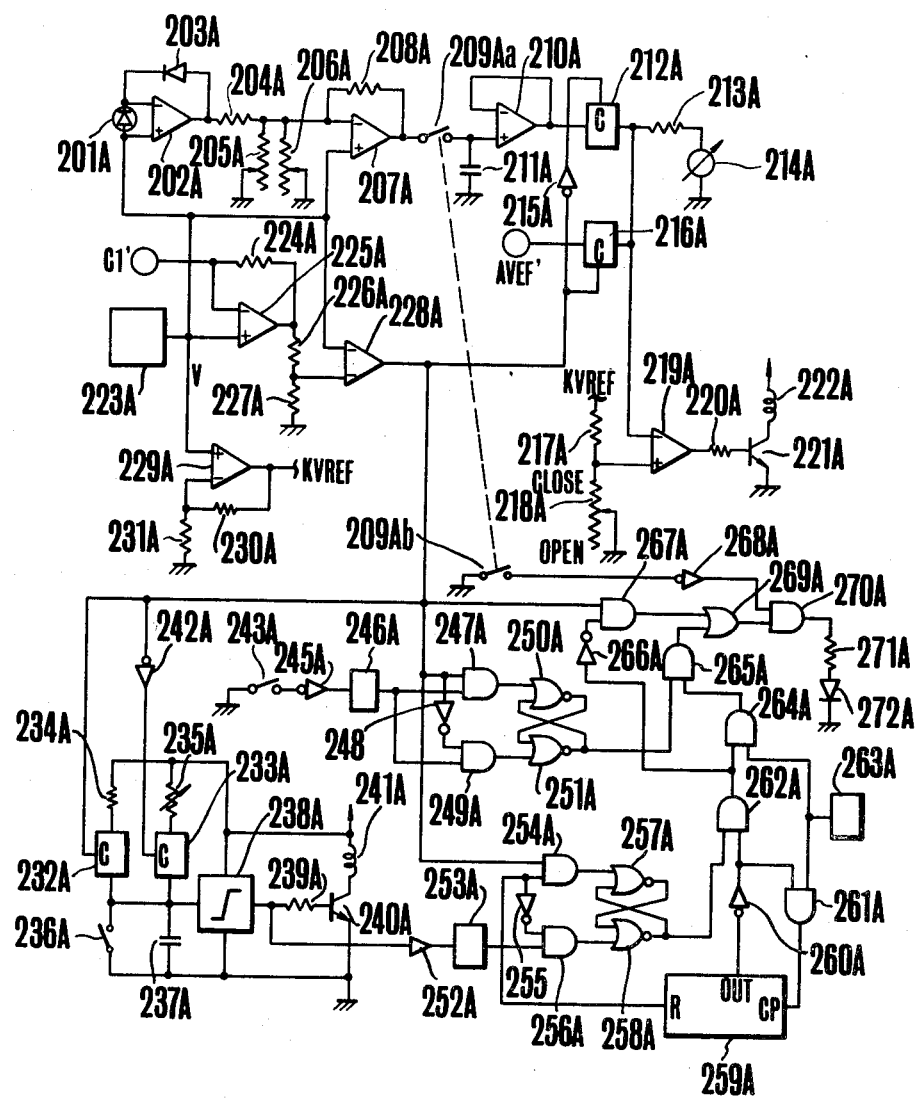
FIG. 6 is an electrical circuit diagram of a camera in a second type of a camera system to which the present invention is applied.

FIG. 6 is an electrical circuit diagram of a camera in a second camera system to which the present invention may be applied. The flash unit of said camera system is the same as that in FIG. 1, therefore, it is omitted from this drawing.

A terminal C' and a terminal $A_{VEF}'$ in this drawing are to be connected to the terminal C1 and the terminal $A_{VEF}$, respectively, in the flash device mentioned above. In this drawing, 202A is an operational amplifier connected to a SPC light receiving element 201A, and 203A is a compression diode connected to the feedback path of the amplifier 202A, wherein a logarithmically compressed information Bv is produced as a voltage at the output of said operational amplifier 202A and is supplied to an inversion input terminal of the operational amplifier 207A through a resistor 204A. Also, 208A is a resistor connected to an operational amplifier 207A and 205A and 206A are variable resistors to set Sv information and Tv information. The operational amplifier 207A performs the operation (Bv+Sv−Tv) with these resistors to produce an aperture value Av signal which is inversely proportional to the voltage. 209A$a$ is a change over switch placed in the ON state before actuation of the camera, that is, during light sensing, and the output voltage of the operational amplifier 207A charges a capacitor 211A during this time. An operational amplifier 210 with a high input impedance functions as a buffer amplifier and does not alter the output of the operational amplifier 207A. While this mirror (not shown in the drawing) is up and the stop down actions are performed as the camera is released in the case of a single lens reflex camera, the change over switch 209A$a$ is placed in OFF state just before these actions. Therefore, during an exposure action, the output of the operational amplifier 210A will become an aperture information Av at the time of release as memorized in the capacitor 211A. Also, said change over switch 209A$a$ is constructed so that it turns ON again when the mirror comes down after an exposure action is completed and the aperture is opened.

Next, 223A is a constant voltage source to supply a reference voltage ($V_{REF}$) to non-inverting input terminals of operational amplifiers 202A, 207A, 225A, and 229A. 224A is a resistor and 228A is a comparator having a non-inverting input terminal connected to a bleeder point of bleeder resistances 226A and 227A, and the constant voltage source 223A is connected to a non-inverting input terminal of said comparator 228A. Also, C1' is a terminal to send a signal, signifying completion of charging, from the flash unit of FIG. 1 to the camera side as mentioned above, and current flows after completion of charging of the flash unit. Therefore, one output of the comparator 228A gets a high level (H) when charging of the main capacitor 7 is completed and gets a low level (L) when said charging is incomplete.

212A and 216A are analog switches, and a control terminal C of the analog switch 212A is connected through an inverter 215A to an output terminal of the comparator 228A, while a control terminal C of the analog switch 216A is directly connected to said output terminal of the comparator 228A. Therefore, the analog switch 212A of a known type becomes ON when the output of the comparator 228 is at a low level under a state the charging of the flash unit is not completed, while the analog switch 216A turns ON when the output of the comparator 228A is at a high level after the charging of the flash unit has been completed. Therefore, at a time the charging is completed, an aperture setting value of the flash unit is supplied to circuits in the latter stage. When the charging is not completed, that is at an AE mode, an aperture value operated by the operational amplifier 207A is supplied to circuits in the latter stage. 219A is a comparator, having the analog switches 212A and 216A connected to an inverting input, and having a bleeder point of a resistor 217A and a variable resistor 218A connected to a non-inverting input. An output of said comparator 219A is connected to a base of a transistor 221A through a resistor 220A.

A voltage ($KV_{REF}$), generated by an operational amplifier 229A and resistors 230A and 231A, based on the voltage ($V_{REF}$), and higher than the voltage ($V_{REF}$), is supplied to resistor 217A. The variable resistor 218A varies a bleeder value by shifting the sliding piece in connection with the stop down action. Therefore, when a stop down action is carried out by a release action of the camera and said bleeder value and the Av signal value from the analog switch 212A or 216A coincide with each other, the transistor 221A is turned OFF. This causes the aperture control magnet 222A to turn OFF at this time to stop an aperture control lever (not shown in the drawing) to determine the aperture of the camera, thus an aperture size is determined. Also, an aperture information Av output from the analog switches 212A and 216A is connected to an ammeter 214A through a resistor 213A. Said ammeter 214A has a pointer placed within the viewfinder of the camera, wherein said pointer is activated in correspondence with said aperture information Av to indicate an aperture information.

Next, 272A is a display element made of a light emitting diode, etc., and 271A is a resistor. Said display element 272 is lighted through an OR gate 269A and an AND gate 270A when the flash unit charging is completed and an output of the comparator 228A is at a high level, further an output of an inverter 266A is at a high level, to display a charging completion of the flash unit, for instance, within the viewfinder by said lighting. Also, 209Ab is a change over switch which turns OFF during exposure in connection with the change over switch 209Aa, and the output of said change over switch 209Ab is supplied to an AND gate 270A through an inverter 268A, to retain a low level output of the AND gate 270A during an exposure. Therefore, the display element 272A will not light during an exposure action.

243A is a change over switch which turns ON when a release action is started, and is synchronized, for example, with a release button. A signal therefrom is connected through an inverter 245A to the one shot circuit 246A forming an AE mode distinguishing circuit, retaining one input terminal each of AND gates 247A and 249A at a high level for a prescribed period of time from the moment the change over switch 243A is turned ON. NOR gates 250A and 251A form a flip-flop. Said flip-flop is set reset by an output of comparator 228A which is supplied to the input of the AND gates 247A and 249A when an output of the one shot circuit is at high level. That is, parts 246A to 251A are elements forming the above-mentioned AE mode distinguishing circuit which is constructed so that when a charging completion signal output supplied by the one shot circuit is at a high level, an output of the NOR gate 251A is at a high level.

236A is a change over switch associated with a leading shutter screen (not shown in the drawing) and is placed in the OFF state when the action of the leading screen is started. Also, 232A and 233A are analog switches, and the analog switch 232A is placed in the ON state when charging is completed because an output terminal of the comparator 228A and a control terminal C thereof are directly connected, and the analog switch 233A is placed in the ON state when charging is not completed when a photograph is made with the AE mode because an output terminal of the comparator 228A is connected through the inverter 242A to a control terminal C thereof.

235A is a variable resistor having its resistance value varied by a shutter dial (not shown in the drawing) and functions in association with the above-mentioned variable resistor 206A for setting operational information mentioned above. 237A is a capacitor performing an integration operation together with the variable resistor 235A when in the AE mode, and at the same time performing an integration function together with a resistor 234A when in the EF mode (during flash photography).

238A is a Schmidt trigger circuit, and an output thereof attains a high level when the voltage of the capacitor 237A is low and attains a low level when the voltage of the capacitor 237A is higher than a prescribed level. One output of said Schmidt trigger circuit 238A is to control a transistor 240A through a resistor 239A and to control a magnet 241A for a follower shutter screen to a shutter time set by the variable resistor 235A or to a fully opened shutter time (for example, 1/60 second) determined by the resistor 234A during EF mode operation. Also, one input terminal each of AND gates 254A and 256A attain a high level for a prescribed period of time after the output of the Schmidt trigger circuit 238A becomes a low level, that is after the follower shutter screen is activated since an output of the Schmidt trigger circuit 238A is connected to a one shot circuit 253A through an inverter 252A. 257A and 258A are NOR gates constituting a flip-flop, which is set reset through the AND gates 254A and 256A controlled by an output of the one shot circuit 253A and an output of the comparator 228. On the other hand, when the flash unit regulates light, the transistor 105 is turned ON for a prescribed period of time after a light emittance, therefore an output of the comparator 228A at this time becomes high, thus if one shot time of the one shot circuit 253A is set to be synchronous with the high level of the comparator, a correct exposure annunciating signal of the flash unit places the NOR gate 258A in a high level. Now the output of the one shot circuit 253A is also connected to a reset terminal R of a counter 259A and is reset during one shot time by the above-mentioned output of the one shot circuit 253A. When the counter 259A is reset, as the output of its output terminal "OUT" becomes low level, the output of inverter 260A becomes high level. Therefore, after the follower shutter screen starts running and the counter 259A is reset, the clock pulse output, from a multi-vibrator circuit 263A, is supplied to the counter 259A through the AND gate 261A to start the counting of said pulses. After that, as said counter 259A counts a prescribed number of pulses, the output terminal "OUT" attains a high level to make the output of the inverter 260A low level and at the same time the AND gate 261A is closed to stop the counting by the counter 259A. Also, in this example, said inverter 260A is set so that the prescribed period of time during which the inverter 260A retains a high level is about 2 seconds. Also, when the output of the NOR gate 258A is at high level, that is when the flash unit of FIG. 1 produces a correct exposure annunciating signal, the output of the AND gate 262A becomes to have a high level for about 2 seconds since the inverter 260A is connected to one input terminal of the AND gate 262A. Clock pulses of the multi-vibrator circuit 263A appear at the output terminal of the AND gate 264A to which the output terminal of the AND gate 262A is connected, during said period of time. If the output of the NOR gate 251A at this time is retained at a high level by a charging completion signal while said signal is added to one input terminal of the AND gate 265A, clock pulses will be produced from the output terminal thereof.

When the camera is released after the flash unit shown in FIG. 1 produces a charging completion signal and the aperture and the shutter of the camera are controlled in an EF mode and the flash unit regulates light when flash photography is is done with an appropriate exposure, the AND gate 265A produces clock pulses of the multi-vibrator circuit 263A from the output terminal thereof. The signal thereof flickers the display element 272A through OR gate 269A, AND gate 270A and a resistor 271A. Also, as has been explained before, as the change over switch 209Ab is turned OFF during an exposure action of the camera, a correct exposure annunciating display will be turned off as well as the charging completion display. Since the counter 259A which flickers a correct exposure annunciating display for a prescribed period of time is reset by the output of the one shot circuit 253A every time an exposure is made, whenever a correct exposure annunciating display is produced, a photograph just before that will have been done by a correct exposure with regulated lighting, thus there will be no erroneous display made at a time of continuous photography.

When the output of the AND gate 262A becomes high level and a display of a correct exposure annunciating signal is made, the output of the AND gate 267A will be retained at a low level because the output of the AND gate 262A is connected to one input terminal of the AND gate 267A through the inverter 266A. Therefore, even when the charging of the flash unit of FIG. 1 is completed and the output of the comparator 228A attains a high level during a display for a correct exposure annunciating signal is being made, the display element 272A will not be placed in a lighted state by the output of the AND gate 267A. That is, when a correct exposure annunciating display is being made by the display element 272A, a charging completion display will be inhibited. Therefore, it can be distinguished whether a flash photography is made with an appropriate exposure or not. Further, when a correct exposure annunciating signal is produced from the comparator 228A while a slit exposure is made, the output of the NOR gate 251A which constitutes the output terminal of the AE mode distinguishing circuit is at L while the output of the AND gate 267A is at L as in the first example mentioned before, therefore said correct exposure annunciating signal will be overridden.

As has been explained above, the present invention cannot only display that an appropriate amount of exposure has been obtained but also can display whether an exposure state of a film has been appropriate or not, thus very useful advantages can be provided. For example, when a film has been exposed in a slit shape, another photography can be made to replace it so that a good picture will not be missed.

What is claimed is:

1. A correct exposure annunciating device having a correct exposure annunciating means, driving means to receive a correct exposure annunciating signal from a flash unit for driving said annunciating means, and means to detect a mode of a camera before a release operation of said camera and to override said annunciating means when the detection result thereof indicates an AE mode.

2. A correct exposure annunciating device according to claim 1, wherein said overriding means contains a circuit which detects a first signal from said flash unit to indicate a state of preparation of the flash unit in response to said release operation and produces an inhibition signal when the first signal indicates a state of incomplete preparation, and a circuit which overrides said correct exposure annunciating signal in response to said inhibition signal.

3. A correct exposure annunciating device according to claim 2, wherein said overriding circuit includes an AND gate connected between the inhibition signal producing circuit and the driving means.

* * * * *